United States Patent
Aluru et al.

(10) Patent No.: US 12,184,971 B2
(45) Date of Patent: Dec. 31, 2024

(54) METHODS AND SYSTEMS FOR AUTOMATED FRAME SYNCHRONIZATION AFTER INITIAL VIDEO FEED

(71) Applicant: GM GLOBAL TECHNOLOGY OPERATIONS LLC, Detroit, MI (US)

(72) Inventors: Sai Vishnu Aluru, Commerce Township, MI (US); Sravan Daruri, Walled Lake, MI (US); Joseph George Machak, Oakland Township, MI (US); Ndikum Atang, Rochester, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 29 days.

(21) Appl. No.: 17/933,939

(22) Filed: Sep. 21, 2022

(65) Prior Publication Data

US 2024/0098364 A1   Mar. 21, 2024

(51) Int. Cl.
*H04N 23/66* (2023.01)
*B60R 1/22* (2022.01)
*H04N 23/667* (2023.01)

(52) U.S. Cl.
CPC ........... *H04N 23/66* (2023.01); *H04N 23/667* (2023.01); *B60R 1/22* (2022.01); *B60R 2300/105* (2013.01); *B60R 2300/303* (2013.01)

(58) Field of Classification Search
CPC ........ H04N 23/66; H04N 23/667; B60R 1/22; B60R 2300/105; B60R 2300/303
See application file for complete search history.

(56) References Cited

U.S. PATENT DOCUMENTS

| | | | |
|---|---|---|---|
| 9,041,813 B1* | 5/2015 | Yakay | H04N 21/4305 348/513 |
| 9,621,768 B1* | 4/2017 | Lyon | H04N 5/00 |
| 10,926,715 B1* | 2/2021 | Soler | B60R 11/04 |
| 2004/0101166 A1* | 5/2004 | Williams | G01P 3/38 348/148 |
| 2012/0162511 A1* | 6/2012 | Hewes | H04N 13/167 348/E5.009 |
| 2019/0135196 A1* | 5/2019 | Vaid | G06V 20/56 |
| 2020/0066145 A1* | 2/2020 | Devor | G08G 1/054 |
| 2022/0303505 A1* | 9/2022 | Itoh | H04N 7/181 |
| 2023/0175852 A1* | 6/2023 | Shambik | G06V 20/588 701/28 |
| 2023/0217137 A1* | 7/2023 | Mikajiri | H04N 25/79 257/186 |

* cited by examiner

*Primary Examiner* — Rowina J Cattungal
(74) *Attorney, Agent, or Firm* — Lorenz & Kopf LLP

(57) ABSTRACT

Methods and systems are provided for generating image data from a vehicle having a plurality of cameras. A method includes: activating, by the processor, initial video feed from each of the plurality of cameras; determining, by the processor, configuration parameters for each of the plurality of cameras based on the initial video feed; in response to a trigger event, performing frame synchronization of subsequent video feed from each of the plurality of cameras based on the configuration parameters; and generating, by the processor, the image data based on the frame synchronization.

7 Claims, 3 Drawing Sheets

METHODS AND SYSTEMS FOR AUTOMATED FRAME SYNCHRONIZATION AFTER INITIAL VIDEO FEED

TECHNICAL FIELD

The technical field generally relates to a perception system of a vehicle, and more particularly to methods and systems for synchronizing frames from multiples cameras of a perception system of a vehicle.

Modern vehicles are typically equipped with one or more optical cameras that are configured to provide image data that may be used for viewing by an occupant of the vehicle or used for automated control. The image data may show a scene of the vehicle's surroundings. The scene may be generated from multiple images that are captured from different cameras. The cameras may be mounted to the vehicle at various locations and may capture images of the surroundings based on different perspectives and different resolutions. Merging image data from the different image sources might cause undesired effects in the output image. For example, a lack of synchronization among the cameras or a delay in camera operation from time of start could result in unexpected blackouts in the displayed image.

Accordingly, it is desirable to provide systems and methods for improving synchronizing of image data from multiples cameras. Furthermore, other desirable features and characteristics of the present invention will become apparent from the subsequent detailed description and the appended claims, taken in conjunction with the accompanying drawings and the foregoing technical field and background.

SUMMARY

Methods and systems are provided for generating image data from a vehicle having a plurality of cameras. A method includes: activating, by the processor, initial video feed from each of the plurality of cameras; determining, by the processor, configuration parameters for each of the plurality of cameras based on the initial video feed; in response to a trigger event, performing frame synchronization of subsequent video feed from each of the plurality of cameras based on the configuration parameters; and generating, by the processor, the image data based on the frame synchronization.

In various embodiments, the trigger event is based on vehicle speed being greater than a threshold.

In various embodiments, the trigger event is based on a transmission range being in reverse.

In various embodiments, the configuration parameters include an x value, and a y value.

In various embodiments, the configuration parameters include a horizontal blanking value and a vertical blanking value.

In various embodiments, when a count of pixels in a frame from a camera of the plurality of cameras exceed a threshold, the method comprises resetting the configuration parameters for the camera of the plurality of cameras.

In various embodiments, the method further includes receiving power on signal data and wherein the activating the initial video feed is in response to the power on signal data.

In another embodiment a system includes: a non-transitory computer readable medium configured to store instructions; and a processor configured to perform the instructions in order to carry out a method. The method includes: activating, by the processor, initial video feed from each of the plurality of cameras; determining, by the processor, configuration parameters for each of the plurality of cameras based on the initial video feed; in response to a trigger event, performing frame synchronization of subsequent video feed from each of the plurality of cameras based on the configuration parameters; and generating, by the processor, the image data based on the frame synchronization.

In various embodiments, the trigger event is based on vehicle speed being greater than a threshold.

In various embodiments, the trigger event is based on a transmission range being in reverse.

In various embodiments, the configuration parameters include an x value, and a y value.

In various embodiments, the configuration parameters include a horizontal blanking value, and a vertical blanking value.

In various embodiments, when a count of pixels in a frame from a camera of the plurality of cameras exceed a threshold, the method comprises resetting the configuration parameters for the camera of the plurality of cameras.

In various embodiments, the method includes receiving power on signal data and wherein the activating the initial video feed is in response to the power on signal data.

In another embodiment, a vehicle includes: a plurality of cameras configured to capture a scene of an environment of the vehicle; and a controller configured to, by a processor: activate initial video feed from each of the plurality of cameras; determine configuration parameters for each of the plurality of cameras based on the initial video feed; in response to a trigger event, perform frame synchronization of subsequent video feed from each of the plurality of cameras based on the configuration parameters; and generate the image data based on the frame synchronization.

In various embodiments, the trigger event is based on vehicle speed being greater than a threshold.

In various embodiments, the trigger event is based on a transmission range being in reverse.

In various embodiments, the configuration parameters include and an x value, a y value, a horizontal blanking value, and a vertical blanking value.

In various embodiments, when a count of pixels in a frame from a camera of the plurality of cameras exceed a threshold, the method comprises resetting the configuration parameters for the camera of the plurality of cameras.

In various embodiments, the controller is further configured to receive power on signal data and activate the initial video feed in response to the power on signal data.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary, or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
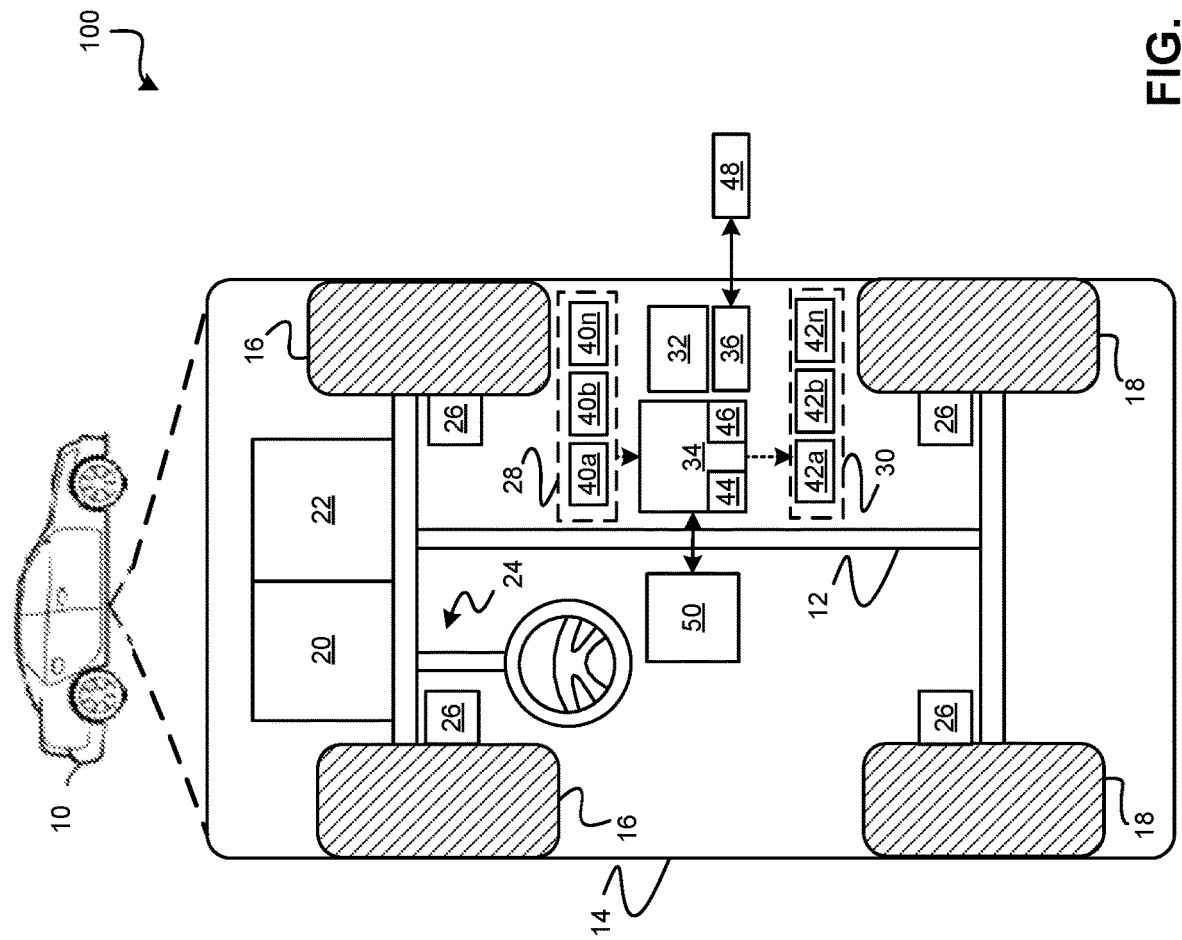
FIG. 1 is a schematic illustration of a vehicle with a controller implementing functions for generating a scene in accordance with various embodiments.

With reference to FIG. 1, an exemplary vehicle 10 is shown having a display system 100 in accordance with various embodiments. Generally, the display system 100 displays image data on a display 50 of the vehicle 10 to illustrate a view of the exterior environment of the vehicle 10 from a defined viewpoint, such as, but not limited to a birds-eye-viewpoint or a rear vehicle viewpoint. As will be discussed in more detail below, the display system 100 synchronizes frames of image data to improve the overall view that is displayed. The synchronization is performed in manner that improves the timing of images displayed.

In various embodiments, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16 and 18 are each rotationally coupled to the chassis 12 near a respective corner of the body 14.

In various embodiments, the vehicle 10 is an autonomous vehicle. The autonomous vehicle is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, robots, or mobile devices, etc., can also be used. In an exemplary embodiment, the autonomous vehicle is an automation system of Level Two or higher. A Level Two automation system indicates "partial automation." However, in other embodiments, the autonomous vehicle may be a so-called Level Three, Level Four or Level Five automation system. A Level Three automation system indicates conditional automation. A Level Four system indicates "high automation," referring to the driving mode-specific performance by an automated driving system of all aspects of the dynamic driving task, even when a human driver does not respond appropriately to a request to intervene. A Level Five system indicates "full automation," referring to the full-time performance by an automated driving system of all aspects of the dynamic driving task under all roadway and environmental conditions that can be managed by a human driver.

However, it is to be understood that the vehicle 10 may also be a conventional vehicle without any autonomous driving functions. The vehicle 10 may implement the functions and methods for synchronizing frames from image data in accordance with the present disclosure.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 an 18 according to selectable speed ratios. According to various embodiments, the transmission system 22 may include a step-ratio automatic transmission, a continuously variable transmission, or other appropriate transmission.

The brake system 26 is configured to provide braking torque to the vehicle wheels 16 and 18. The brake system 26 may, in various embodiments, include friction brakes, brake by wire, a regenerative braking system such as an electric machine, and/or other appropriate braking systems. The steering system 24 influences a position of the of the vehicle wheels 16 and 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems (GPS), optical cameras, thermal cameras, ultrasonic sensors, and/or other sensors. In various embodiments, the sensing devices 40a-40n include multiple cameras disposed at various different locations of the vehicle 10. For example, the cameras are disposed such that they each cover a certain field of view of the vehicle's surroundings (e.g., a left side vehicle camera, a right side vehicle camera, a rear vehicle camera, a front vehicle camera, etc.). The video feed from two or more of the cameras is assembled into a single view based on, for example, synchronized image frames generated as a result of the methods and systems disclosed herein. The synchronized image data is then used for display and/or for perception analysis and control.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The communication system 36 is configured to wirelessly communicate information to and from other entities 48, such as but not limited to, other vehicles ("V2V" communication) infrastructure ("V2I" communication), remote systems, and/or personal devices. In an exemplary embodiment, the communication system 36 is a wireless communication system configured to communicate via a wireless local area network (WLAN) using IEEE 802.11 standards or by using cellular data communication. However, additional, or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling functions of the vehicle 10. In various embodiments, the data storage device 32 stores defined maps of the navigable environment. The defined maps may include a variety of data other than road data associated therewith, including elevation, climate, lighting, etc. For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling and executing functions of the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the display system 100 and, when executed by the processor 44, receives input from the sensor system 28 and prioritizes and synchronizes the frames of the video feed from the multiple cameras. The instructions perform the synchronization based on vehicle logistics to support the viewing of and the perception analysis of the image data displayed from the multiple cameras.

It will be appreciated that the controller 34 may otherwise differ from the embodiments depicted in FIG. 1. For example, the controller 34 may be coupled to or may otherwise utilize one or more remote computer systems and/or other control systems, for example as part of one or more of the above-identified vehicle devices and systems. It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 44) to perform and execute the program. Such a program product may take a variety of forms, and the present disclosure applies equally regardless of the particular type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 34 may also otherwise differ from the embodiment depicted in FIG. 1, for example in that the computer system of the controller 34 may be coupled to or may otherwise utilize one or more remote computer systems and/or other control systems.

Figure 2:
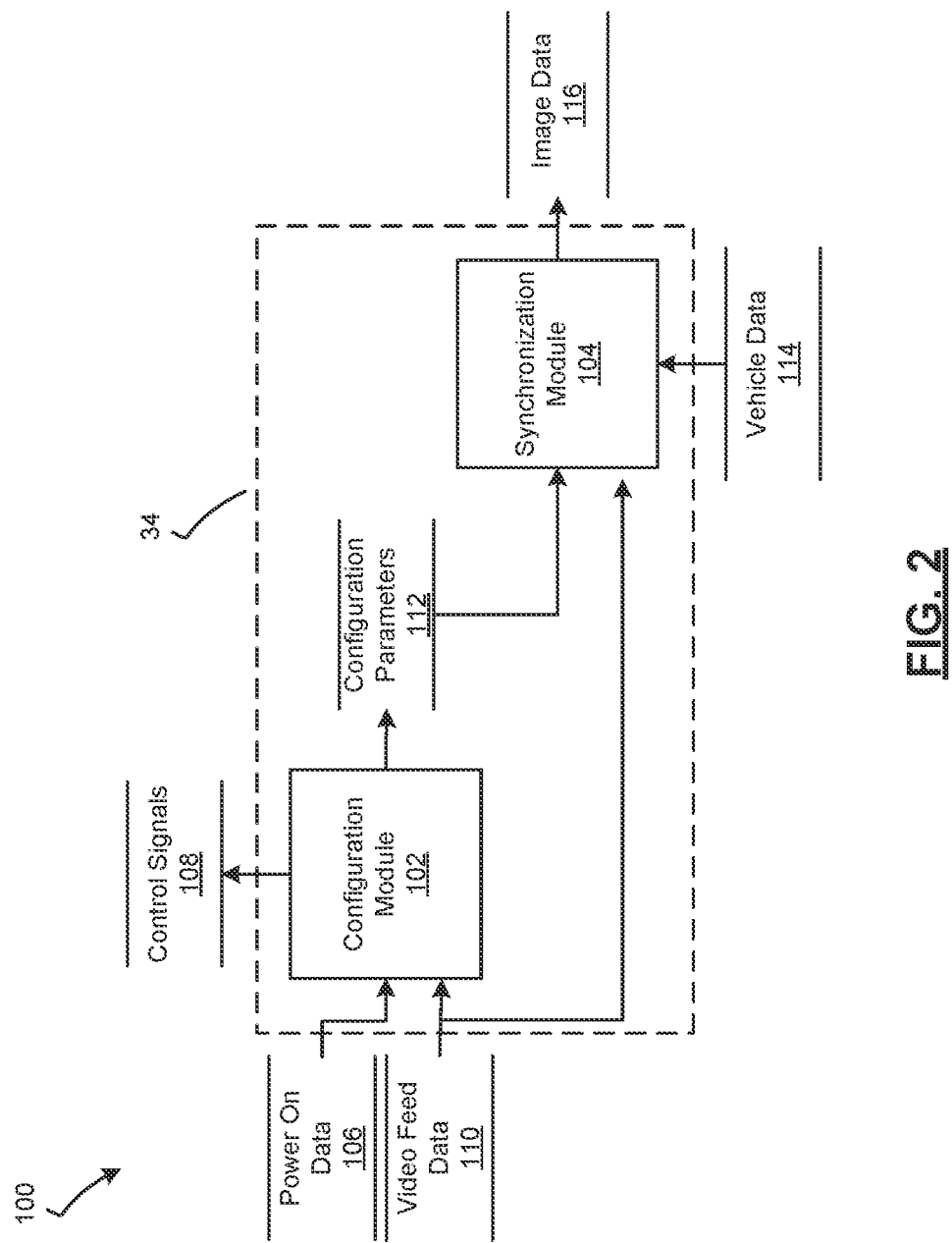
FIG. 2 is dataflow diagram illustrating the controller of the vehicle in accordance with various embodiments.

With reference to FIG. 2, and with continued reference to FIG. 1, a dataflow diagram illustrates elements of the display system 100 of FIG. 1 in accordance with various embodiments. As can be appreciated, various embodiments of the display system 100 according to the present disclosure may include any number of modules embedded within the controller 34 which may be combined and/or further partitioned to similarly implement systems and methods described herein. Furthermore, inputs to the display system 100 may be received from the sensor system 28, received from other control modules (not shown) associated with the vehicle 10, and/or determined/modeled by other sub-modules (not shown) within the controller 34 of FIG. 1. Furthermore, the inputs might also be subjected to preprocessing, such as sub-sampling, noise-reduction, normalization, feature-extraction, missing data reduction, and the like. In various embodiments, the display system 100 includes a configuration module, and a synchronization module.

In various embodiments, the configuration module 102 receives as input power on data 106. In response to the power on data 106 indicating that the vehicle 10 and/or sensor system 28 is powered on, the configuration module 102 generates controls signals 108 to activate the video feed from each of the cameras of the sensor system 28. In response, the configuration module 102 receives video feed data 110 from each of the cameras of the sensor system 28. The configuration module uses the initial video feed to determine configuration parameters 112.

In various embodiments, the synchronization module 104 receives as input the video feed data 110 from the cameras of the sensor system 28, and vehicle data 114. The synchronization module 104 generates image data 116 for display and/or analysis based on the video feed data 110. When the vehicle data 114 indicates that a vehicle condition is true, such as, the transmission being in reverse, or the vehicle speed being greater than a threshold, the synchronization module 104 generates the image data 116 in a synchronized format using the configuration parameters 112 and the video feed data 110.

Figure 4:
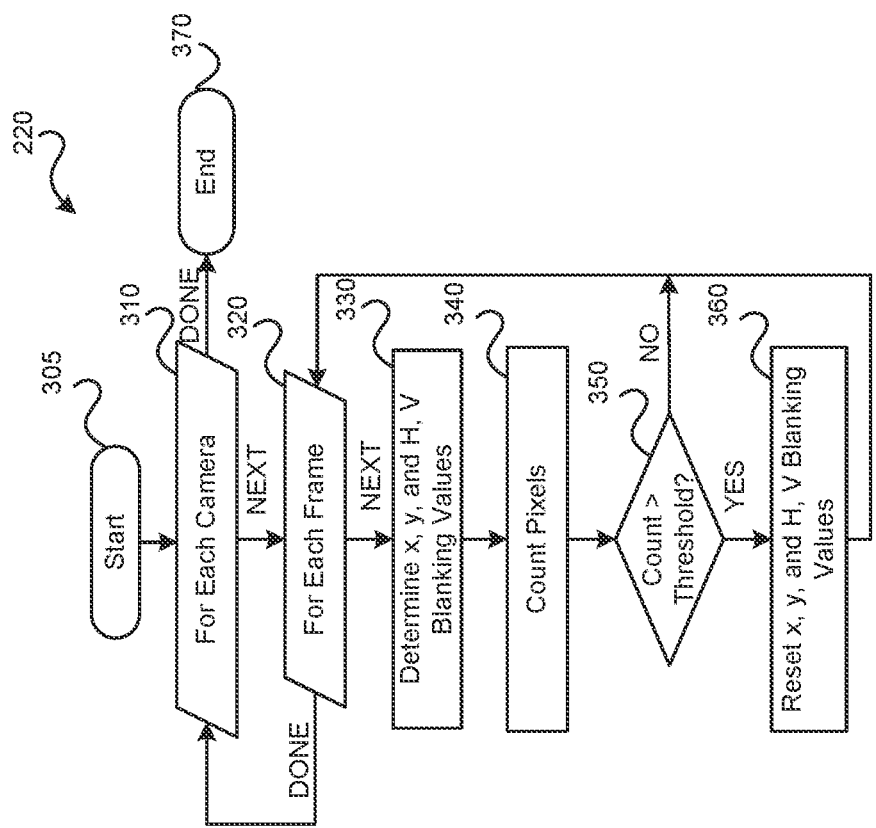
FIGS. 3 and 4 are flowcharts illustrating methods performed by the vehicle and the controller in accordance with various embodiments.
Figure 3:
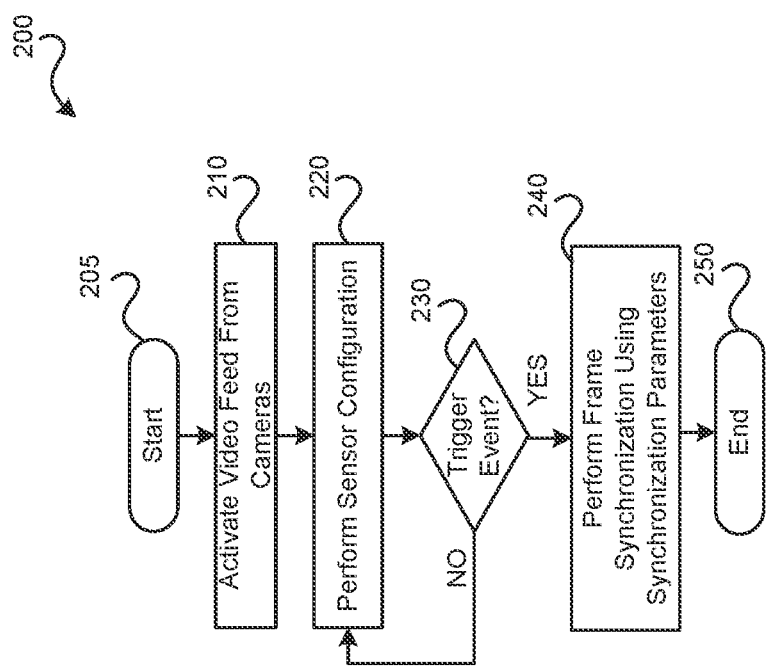

With reference to FIGS. 3 and 4 and with continued reference to FIGS. 1-2, flowcharts illustrate methods 200, 220 for generating image data for use in display or other analysis within the vehicle 10 of FIG. 1. As can be appreciated in light of the disclosure, the order of operation within the methods is not limited to the sequential execution as illustrated in FIGS. 3 and 4, but may be performed in one or more varying orders as applicable and in accordance with the present disclosure. In various embodiments, the methods 200, 220 can be scheduled to run based on one or more predetermined events, and/or can run continuously during operation of the vehicle 10.

In one example, the method 200 may begin at 205 for example, when the vehicle 10 is powered on. The video feed is activated for each of the multiple cameras at 210. Sensor configuration is performed using the video feed from the multiple cameras at 220.

The sensor configuration is performed until a trigger event occurs at 230. For example, the trigger event can include the transmission of the vehicle 10 being placed in reverse, or the vehicle speed being greater than a threshold. As can be appreciated, other trigger events can be implemented in various embodiments as the reverse operation and the vehicle speed are some examples.

Once a trigger event occurs at 230, the video feed is re-started and processed using the configuration parameters identified during the initial video feeds from the multiple cameras at 240. Thus, the video feed subsequent to the initial feed is provided in a synchronized manner for display and/or further analysis. Thereafter, the method 200 may end at 250.

In another example, the method of performing sensor configuration 220 of FIG. 3, may begin at 305. For each camera at 310, and for each frame of the video feed produced by the camera at 320, the configuration parameters including x and y values as well as the horizontal and vertical blanking values of the frame are determined at 330. The pixels of the frame are determined and counted using the x, y values and H, V blanking values at 340. If the pixel count is greater than a threshold at 350, the configuration parameters are reset at 360 and the method 220 continues with processing the next frame at 320. If the pixel count is less than the threshold, at 350 the method 220 continues with processing the next frame at 320. The method continues until the cameras are processed at 310. Thereafter, the method 220 may end at 370.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for generating image data from a vehicle having a plurality of cameras, the method comprising:
    activating, by a processor, an initial video feed from each of the plurality of cameras in response to a power on signal associated with the vehicle, wherein the power on signal comprises an indication the vehicle is powered on and activating the initial video feed from each of the plurality of cameras comprises activating the initial video feed from each of the plurality of cameras in response to the indication the vehicle is powered on;
    determining, by the processor, configuration parameters for each of the plurality of cameras based on the initial video feed;
    in response to occurrence of the vehicle being placed in reverse:
        re-starting a subsequent video feed from each of the plurality of cameras;
        performing frame synchronization of the subsequent video feed from each of the plurality of cameras based on the configuration parameters; and
        generating, by the processor, the image data in a synchronized format based on the frame synchronization using the configuration parameters and the subsequent video feed, wherein generating the image data comprises displaying a birds-eye viewpoint in the synchronized format using the subsequent video feed from each of the plurality of cameras.

2. The method of claim 1, wherein the configuration parameters include an x value, and a y value.

3. The method of claim 1, wherein the configuration parameters include a horizontal blanking value and a vertical blanking value.

4. The method of claim 1, wherein when a count of pixels in a frame from a camera of the plurality of cameras exceed a threshold, the method comprises resetting the configuration parameters for the camera of the plurality of cameras.

5. A vehicle, comprising:
    a plurality of cameras configured to capture a scene of an environment of the vehicle; and
    a controller configured to, by a processor:
        activate an initial video feed from each of the plurality of cameras in response to a power on signal associated with the vehicle, wherein the power on signal comprises an indication the vehicle is powered on and activating the initial video feed from each of the plurality of cameras comprises activating the initial video feed from each of the plurality of cameras in response to the indication the vehicle is powered on;
        determine configuration parameters for each of the plurality of cameras based on the initial video feed;
        in response to occurrence of the vehicle being placed in reverse:
            re-start a subsequent video feed from each of the plurality of cameras;

perform frame synchronization of the subsequent video feed from each of the plurality of cameras based on the configuration parameters; and generate the image data in a synchronized format based on the frame synchronization using the configuration parameters and the subsequent video feed, wherein generating the image data comprises displaying a birds-eye viewpoint in the synchronized format using the subsequent video feed from each of the plurality of cameras.

6. The vehicle of claim 5, wherein the configuration parameters include and an x value, a y value, a horizontal blanking value, and a vertical blanking value.

7. The vehicle of claim 5, wherein when a count of pixels in a frame from a camera of the plurality of cameras exceed a threshold, the method comprises resetting the configuration parameters for the camera of the plurality of cameras.

* * * * *